(12) United States Patent
Nakada et al.

(10) Patent No.: US 11,660,705 B2
(45) Date of Patent: May 30, 2023

(54) LASER WELDING METHOD

(71) Applicant: TOYOTA JIDOSHA KABUSHIKI KAISHA, Toyota (JP)

(72) Inventors: Koki Nakada, Toyota (JP); Toru Hioki, Miyoshi (JP); Atsushi Kawakita, Miyoshi (JP); Shuhei Ogura, Nagakute (JP); Takashi Goto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 16/393,273

(22) Filed: Apr. 24, 2019

(65) Prior Publication Data

US 2019/0329361 A1 Oct. 31, 2019

(30) Foreign Application Priority Data

Apr. 25, 2018 (JP) .............................. JP2018-083609

(51) Int. Cl.
| | |
|---|---|
| *B23K 26/082* | (2014.01) |
| *B23K 26/244* | (2014.01) |
| *B23K 26/70* | (2014.01) |
| *B23K 26/24* | (2014.01) |
| *B23K 26/32* | (2014.01) |
| *B23K 103/10* | (2006.01) |

(52) U.S. Cl.
CPC .......... *B23K 26/703* (2015.10); *B23K 26/082* (2015.10); *B23K 26/24* (2013.01); *B23K 26/32* (2013.01); *B23K 2103/10* (2018.08)

(58) Field of Classification Search
CPC .............................. B23K 26/082; B23K 26/22
See application file for complete search history.

(56) References Cited

U.S. PATENT DOCUMENTS 9,815,142 B2 * 11/2017 Ogura .................... B23K 26/22
10,137,530 B2 * 11/2018 Hisada ................. B23K 26/082
(Continued)

FOREIGN PATENT DOCUMENTS

| CN | 106029291 A | 10/2016 |
| CN | 106715035 A | 5/2017 |

(Continued)

*Primary Examiner* — Helena Kosanovic
*Assistant Examiner* — Lawrence H Samuels
(74) *Attorney, Agent, or Firm* — Sughrue Mion, PLLC

(57) ABSTRACT

A laser welding method is provided to ensure a sufficient joining strength between metal plates by increasing the area of a joining region while preventing "burn through" of a molten metal. In the laser welding method by applying a laser beam to a surface of multiple metal plates superimposed on each other, a scanning locus with the laser beam is sequentially shifted from an inner circular scanning locus to an outer one in a predetermined joining region on the metal plates, and an emission interval is provided to temporally stop the metal-plate-surface irradiation when the scanning locus is shifted. Thus, every time the scanning locus is shifted, the molten metal due to the previous irradiation is cooled and increases its viscosity. Accordingly, the "burn through" is prevented regardless of increase of the area of the joining region, which results in a sufficient joining strength between the metal plates.

4 Claims, 12 Drawing Sheets

(56) References Cited

U.S. PATENT DOCUMENTS

| | | | |
|---|---|---|---|
| 10,286,491 B2* | 5/2019 | Nakagawa | B23K 26/22 |
| 10,675,713 B2* | 6/2020 | Yang | B23K 26/082 |
| 2006/0226128 A1* | 10/2006 | Otsuka | B23K 26/0884 |
| | | | 219/121.64 |
| 2013/0171467 A1 | 7/2013 | Nishikawa et al. | |
| 2014/0048518 A1* | 2/2014 | Ogura | B23K 26/244 |
| | | | 219/121.64 |
| 2015/0283648 A1* | 10/2015 | Hisada | B23K 26/082 |
| | | | 403/272 |
| 2016/0061727 A1* | 3/2016 | Kobayashi | B23K 26/082 |
| | | | 356/445 |
| 2017/0050269 A1* | 2/2017 | Nakagawa | B23K 26/082 |
| 2017/0274473 A1 | 9/2017 | Naito et al. | |
| 2018/0029162 A1 | 2/2018 | Ogura et al. | |
| 2018/0043472 A1* | 2/2018 | Yang | B23K 26/082 |
| 2018/0071866 A1* | 3/2018 | Aoki | B23K 26/082 |
| 2018/0126491 A1* | 5/2018 | Nakagawa | B23K 26/082 |
| 2018/0214983 A1* | 8/2018 | Yang | B23K 26/082 |
| 2018/0245616 A1* | 8/2018 | Kumazawa | B23K 26/08 |
| 2019/0070695 A1 | 3/2019 | Hisada et al. | |
| 2020/0114469 A1* | 4/2020 | Tao | B23K 26/0876 |

FOREIGN PATENT DOCUMENTS

| | | |
|---|---|---|
| JP | 2000-351086 A | 12/2000 |
| JP | 2010-023047 A | 2/2010 |
| JP | 2012-228715 A | 11/2012 |
| JP | 2014-4619 A | 1/2014 |
| JP | 2015-199097 A | 11/2015 |
| WO | 2012/124255 A1 | 9/2012 |
| WO | 2016/043278 A1 | 3/2016 |
| WO | 2017/035729 A1 | 3/2017 |

* cited by examiner (a)

(b)

(a)

(b)

(a)

(b)

(a)

(b)

(a)

(b)

(a)

(b)

LASER WELDING METHOD

CROSS-REFERENCE TO RELATED APPLICATIONS

The present application claims priority under 35 U.S.C. § 119(a) to Japanese Patent Application No. 2018-83609, filed on Apr. 25, 2018. The contents of this application are incorporated herein by reference in its entirety.

TECHNICAL FIELD

The present invention relates to a laser welding method for joining a plurality of metal plates superimposed on each other. Particularly, the present invention relates to improvement of an irradiation mode on a metal plate with a laser beam.

BACKGROUND ART

Conventionally, laser welding is known as a method for joining (welding) a plurality of metal plates superimposed on each other. Patent Document 1 discloses a method for welding two metal plates superimposed on each other, which includes the steps of: irradiating a surface of the metal plates with a laser beam; melting the metal plates to form a molten pool; and irradiating the molten pool with the laser beam to flow molten metal in the molten pool. Thus, the joining strength between the metal plates is ensured.

PRIOR ART DOCUMENT

Patent Document
Patent Document 1: JP 2012-228715 A

SUMMARY OF THE INVENTION

Problem to be Solved by the Invention

However, when a gap formed between the metal plates (i.e. a plate gap) is large, it is necessary to increase the amount of molten metal in order to make the molten metal bridge the gap over the respective metal plates. In this case, a welding defect called as "burn through" may be generated. That is, the molten metal of the metal plate irradiated with the laser beam (i.e. an upper plate when the metal plates are superimposed on each other in the vertical direction) may fall toward the other metal plate (i.e. a lower plate when the metal plates are superimposed on each other in the vertical direction). In particular, when an area of the joining region (i.e. an area of the molten metal that hardens in plan view of the metal plate) on the metal plate is increased in order to ensure a sufficient joining strength between the metal plates, a larger amount of molten metal is needed. Accordingly, the "burn through" is likely to occur, which results in an insufficient joining strength.

FIG. 15 are diagrams illustrating a state of metal plates having an increased joining region during irradiation with the laser beam in the conventional laser welding. FIG. 15(a) is a cross-sectional view of the joining region of the metal plates and the laser beam. FIG. 15(b) is a plan view of the metal plates. In FIG. 15, the laser welding is performed in a state in which the gap formed between the metal plates (an upper plate a and a lower plate b) is large, where the laser beam is indicated by the dashed dotted line. A molten metal c of the upper plate a hangs down toward the lower plate b. When the irradiation with the laser beam is continued under the circumstances, the molten metal c may be detached from the upper plate a to generate the "burn through", as shown in FIG. 16 (diagrams illustrating a state in which the irradiation with the laser beam is completed, which respectively correspond to the diagrams of FIG. 15). That is, in FIG. 16, the molten metal c is not bridged between the upper plate a and the lower plate b at the part enclosed by the circle indicated by the dashed double-dotted line, which means that a sufficient joining strength cannot be ensured.

As described above, in the conventional art, it is difficult to sufficiently obtain the joining strength between the metal plates by increasing the area of the joining region while preventing the "burn through" of the molten metal.

The present invention was made in consideration of the above problem, an object of which is to provide a laser welding method capable of ensuring a sufficient joining strength between metal plates by increasing an area of a joining region while preventing the "burn through" of a molten metal.

Means for Solving the Problem

As a means for solving the above problem to achieve the object of the present invention, a laser welding method for joining metal plates is provided, which includes the steps of: applying a laser beam to a surface of a plurality of metal plates superimposed on each other; melting the metal plates by scanning a position to be irradiated so as to make a molten pool constituted of the molten metal; stirring the molten pool by scanning with the laser beam; shifting sequentially a scanning locus to be scanned with the laser beam from an inner circular scanning locus to an outer circular scanning locus in a predetermined joining region on the metal plates; and providing an emission interval at the time of shifting the scanning locus to be scanned with the laser beam so that the irradiation on the surface of the metal plates with the laser beam is temporally stopped.

With the above-described configuration, when a plurality of metal plates superimposed on each other is joined by laser welding, the scanning with the laser beam (applying the laser beam) is performed along the inner circular scanning locus in the predetermined joining region on the metal plates so as to melt the metal (metal material) in the vicinity of the scanning locus. A molten pool constituted of the molten metal is scanned and stirred with the laser beam. After that, the irradiation on the surface of the metal plates with the laser beam is temporally stopped when the scanning locus to be scanned with the laser beam is shifted to the outer circular scanning locus. In other words, after a certain emission interval (i.e. period for which the irradiation on the surface of the metal plates with the laser beam is temporally stopped) elapses, the scanning with the laser beam (applying the laser beam) is re-started along the outer circular scanning locus so as to melt the metal material in the vicinity of the outer circular scanning locus. A molten pool constituted of the molten metal is scanned and stirred with the laser beam. By repeatedly preforming the above procedures, every time the scanning locus to be scanned with the laser beam is shifted, a period is provided to cool the metal that has been molten due to the previous irradiation with the laser beam. Such lowering of the temperature of the molten metal increases its viscosity, which leads to reduction in the mass of the metal molten by irradiation with the laser beam after the scanning locus to be scanned with the laser beam is shifted (i.e. the mass of the molten metal having the low viscosity is reduced). As a result, it is possible to prevent generation of "burn through" of the molten metal. That is, the "burn through" can be reduced even when the area of the joining region is increased. Therefore, it is possible to ensure the sufficient joining strength between the metal plates by increasing the area of the joining region while preventing the "burn through" of the molten metal.

It is preferable that the circular scanning loci are concentric circles centered at a central part of the joining region.

In this case, the scanning with the laser beam is successively performed along the respective concentric circular scanning loci, and the irradiation on the surface of the metal plates with the laser beam is temporally stopped at the time of shifting the scanning locus. In this way, it is possible to realize the circular joining region having a large area while preventing the "burn through" of the molten metal.

When each of all the emissions of the laser beam is performed along the corresponding circular scanning locus at the emission interval, it is preferable that the output of the laser beam that is applied to the innermost circular scanning locus in the joining region is set larger than the output of the laser beam that is applied to any of the other circular scanning loci.

In the case where each of all the emissions of the laser beam is performed along the corresponding circular scanning locus at the emission interval, when the laser beam is applied to the innermost circular scanning locus in the joining region, the metal material of the joining region has not at all been molten yet. Thus, the metal material requires a large heat input in order to be molten compared to the case in which the laser beam is applied to any of the other scanning loci (i.e. the case in which the metal material has already been molten at the inner circular scanning locus). Taking into account the above circumstances, in this means for solving the problem, the output of the laser beam applied to the innermost circular scanning locus is set larger than the output of the laser beam applied to any of the other circular scanning loci, so that the metal material in the vicinity of the innermost circular scanning locus is effectively molten and the time required to perform the laser welding is shorten.

Also, when the laser beam is applied to one point of the central part of the joining region before application of the laser beam to the innermost circular scanning locus in the joining region, it is preferable that the output of the laser beam applied to the one point of the central part is set larger than the output of the laser beam that is applied to any of the other circular scanning loci.

In the case where the laser beam is applied to one point of the central part of the joining region before application of the laser beam to the innermost circular scanning locus in the joining region, when the laser beam is applied to the one point of the central part of the joining region, the metal material of the joining region has not at all been molten yet. Thus, the metal material requires a large heat input in order to be molten. Taking into account the above circumstances, in this means for solving the problem, the output of the laser beam applied to the one point of the central part of the joining region is set larger than the output of the laser beam applied to the circular scanning loci, so that the metal material in the central part of the joining region is effectively molten and the time required to perform the laser welding is shorten.

It is preferable that the length of the emission interval is set longer as the circular scanning locus to be scanned with the laser beam is shifted to the outer circular scanning locus.

When the scanning locus to be scanned with the laser beam is sequentially shifted from the inner circular scanning locus to the outer circular scanning locus in the joining region, the subsequent irradiation with the laser beam (i.e. application of the laser beam along the outer circular scanning locus) is performed before the molten metal has completely hardened, even when the emission interval is provided. In other words, the subsequent irradiation with the laser beam is performed on the metal plates in which heat is stored. The amount of heat stored in the metal plates has a tendency to increase as the irradiation with the laser beam is shifted between the adjacent two of the circular scanning loci on the outer side. Taking into account the above circumstances, in this means for solving the problem, the length of the emission interval is set longer as the circular scanning locus to be scanned with the laser beam is shifted to the outer one, so that hardening of the molten metal is accelerated (in other words, the viscosity is reduced). Therefore, the "burn through" of the molten metal is reliably prevented.

Advantageous Effect of the Invention

In the laser welding in which the laser beam is applied to a surface of a plurality of metal plates superimposed on each other of the present invention, the scanning locus to be scanned with the laser beam is sequentially shifted from an inner circular scanning locus to an outer circular scanning locus in a predetermined joining region on the metal plates, and an emission interval is provided at the time of shifting the scanning locus to be scanned with the laser beam so that the irradiation on the surface of the metal plates with the laser beam is temporally stopped. In this way, every time the scanning locus to be scanned with the laser beam is shifted, a period is provided to cool the metal that has been molten due to the previous irradiation with the laser beam, and such lowering of the temperature of the molten metal increases its viscosity. As a result, the "burn through" of the molten metal can be reduced even when the area of the joining region is increased. Therefore, it is possible to ensure the sufficient joining strength between the metal plates.

BRIEF DESCRIPTION OF THE DRAWINGS

FIG. 2(a) is a plan view illustrating a metal plate and a scanning locus of the laser beam. FIG. 2(b) is a cross-sectional view illustrating a joining region between metal plates and the laser beam.

FIG. 14(a) is a plan view illustrating the metal plate having two joining regions adjacent to each other. FIG. 14(b) is a plan view illustrating the metal plate having three joining regions adjacent to one another.

FIG. 15(a) is a cross-sectional view illustrating the joining region of the metal plates and the laser beam. FIG. 15(b) is a plan view illustrating the metal plate.

DESCRIPTION OF EMBODIMENT

Hereinafter, an embodiment of the present invention will be described with reference to the drawings. In this embodiment, a description will be given on a case in which the present invention is applied as a laser welding method that is performed by a laser welding apparatus used in a manufacturing process of vehicles bodies.

—Schematic Configuration of Laser Welding Apparatus—

Figure 1:
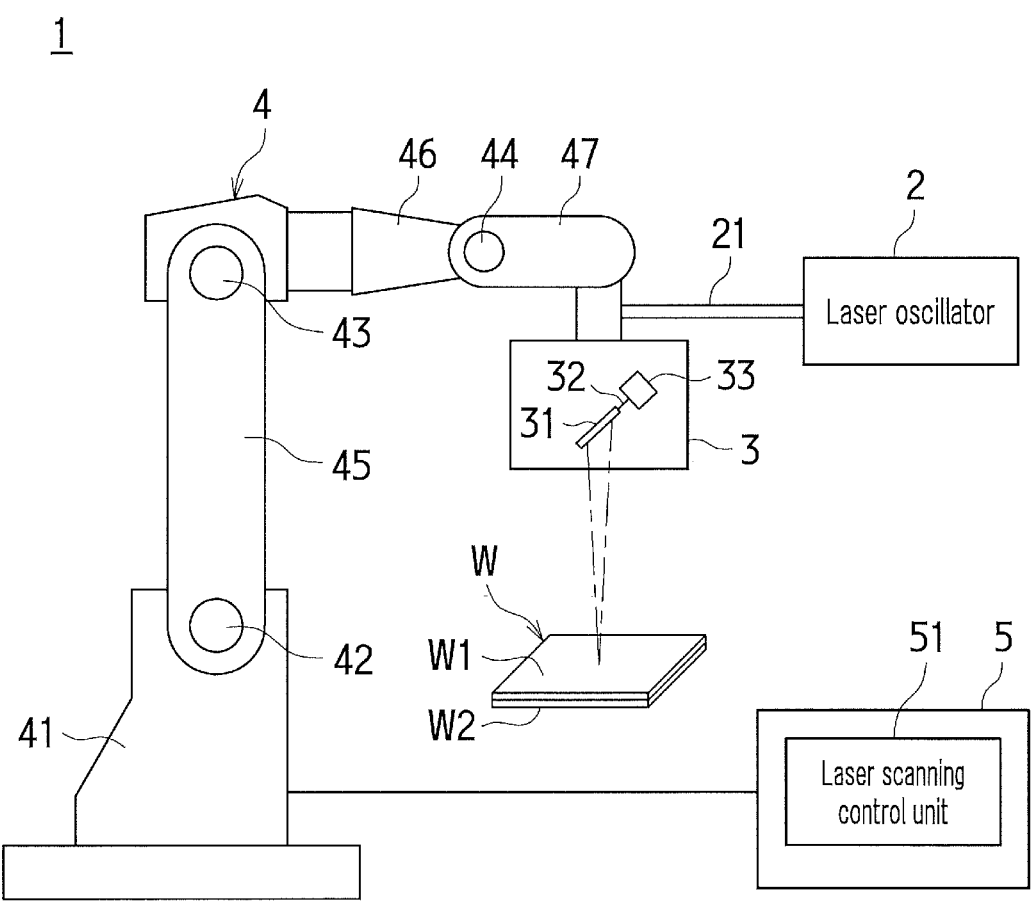
FIG. 1 is a schematic configuration diagram illustrating a laser welding apparatus used for laser welding according to an embodiment.

FIG. 1 is a schematic configuration diagram illustrating a laser welding apparatus 1 used for laser welding according to this embodiment. As shown in FIG. 1, the laser welding apparatus 1 includes a laser oscillator 2, a laser scanner 3, a welding robot 4 and a robot controller 5.

The laser oscillator 2 generates a laser beam. The generated laser beam is guided to the laser scanner 3 via an optical fiber cable 21. It is possible to use the laser beam such as a carbon dioxide laser, a YAG laser, or a fiber laser.

The laser scanner 3 irradiates a workpiece W, which is formed by superimposing two plate materials made of aluminum alloy (aluminum metal plates, hereinafter occasionally referred to as simply "metal plates") W1 and W2 on each other, with the laser beam guided via the optical fiber cable 21 (see the dashed dotted line in FIG. 1). In the laser scanner 3, a plurality of lenses (not shown) and a plurality of mirrors 31 (in FIG. 1, only one mirror 31 is shown) are housed. As the lenses, the laser scanner 3 includes, for example, a collimating lens to convert the laser beam into a parallel beam and a condensing lens to converge the laser beam such that the converged laser beam is focused on a machining point of the workpiece W (i.e. on a predetermined position irradiated with the laser beam on the workpiece W). Also, each mirror 31 is rotatable about a rotary shaft 32. Specifically, the rotary shaft 32 is coupled to a scanning motor 33, and the scanning motor 33 is activated to rotate the rotary shaft 32 that causes the mirror 31 to rotate. Then, the workpiece W is scanned with the laser beam by the rotation of the mirror 31, and thus the position irradiated with the laser beam can be changed within the predetermined area on the workpiece W. In this way, it is possible to change the position irradiated with the laser beam without moving the laser scanner 3 itself. Each of the mirrors 31 may, for example, be constituted of a galvanometer mirror.

The laser welding according to this embodiment is a so-called laser screw welding (LSW). That is, a welding part (a joining region) of the workpiece W is scanned with the laser beam along a predetermined scanning locus so that the welding part is molten to be welded. The scanning with the laser beam is performed by the mirrors 31. The scanning with the laser beam will be described in detail later.

The welding robot 4 is configured to cause the laser scanner 3 to move. The welding robot 4 is constituted of an articulated robot. Specifically, the welding robot 4 of this embodiment includes: a base 41; a rotation mechanism (not shown) housed in the base 41; joints 42, 43 and 44; and arms 45, 46 and 47. The laser scanner 3 can be moved in a desired direction by rotating motions of the rotation mechanism and swinging motions of the arms 45, 46 and 47 about the joints 42, 43 and 44.

Information for moving the laser scanner 3 toward a part to be welded (for example, information on respective amounts of rotation angles at the joints 42, 43 and 44) is stored in the robot controller 5 by off-line teaching previously performed. When a vehicle body is conveyed to the welding work station on the vehicle body manufacturing line, the welding robot 4 operates based on the above information in response to a control signal from the robot controller 5. Thus, the laser scanner 3 is faced to the part to be welded so that the laser beam is emitted from the laser scanner 3 to the part to be welded. In this way, the laser welding is sequentially performed.

Also, the robot controller 5 includes a laser scanning control unit 51 to output a control signal to change the position to be irradiated with the laser beam on the workpiece W. The laser scanning control unit 51 outputs the control signal to the scanning motor 33. The scanning motor 33 operates in response to the control signal so as to perform the scanning with the laser beam by rotation of the respective mirrors 31 about the rotary shafts 32. Thus, the position to be irradiated with the laser beam on the workpiece W is moved. The movement of the position to be irradiated with the laser beam (i.e. the scanning) on the workpiece W will be described later.

—Welding Method—

Here, a welding method (laser welding method) as a characteristic feature of this embodiment is described. In this embodiment, a description is given on the case in which two metal plates W1 and W2 superimposed on each other in the vertical direction are subjected to a lap welding. In particular, the superimposed part of the metal plates W1 and W2 is irradiated, from the above, with the laser beam emitted by the laser scanner 3. Hereinafter, the upper metal plate is referred to as an upper plate W1 while the lower metal plate is referred to as a lower plate W2.

The laser welding according to this embodiment is performed by scanning a joining region previously determined on the upper plate W1 with the laser beam. Specifically, a plurality of (in this embodiment, five) concentric circle shaped scanning loci (annular scanning loci; i.e. circular scanning loci in the present invention) centered at a central part of the joining region is previously determined. Then, the scanning locus to be scanned with the laser beam is sequentially shifted from the inner circular scanning locus to the outer circular scanning locus out of the circular scanning loci. The joining region is set as a circular region having a predetermined outer diameter size. The outer diameter size is previously determined as a size to obtain a desirable joining strength between the metal plates W1 and W2, taking into account, for example, the rigidity of a vehicle.

The respective circular scanning loci are five concentric circles centered at the central part of the joining region. The scanning with the laser beam is performed sequentially from a first scanning locus SC1 defined as the innermost locus (see FIG. 2) to a fifth scanning locus SC5 defined as the outermost locus (see FIG. 6). When the scanning locus to be scanned with the laser beam is shifted, an emission interval is provided so as to temporally stop the emission of the laser beam to the surface of the upper plate W1. By providing this emission interval, a period for cooling the metal that has been molten due to irradiation with the laser beam can be ensured, which results in a high viscosity of the molten metal due to lowering of the temperature thereof. Also by providing the emission interval, the subsequent emission of the laser beam is performed (i.e. the laser beam is applied along the outer circular scanning locus) after the temperature of the molten metal has decreased. Thus, it is possible to reduce the heat input per unit volume to the molten metal and to reduce spatter (i.e. scattering of the molten metal). As a result, it is possible to prevent thinning of the molten metal that is bridged over the upper plate W1 and the lower plate W2.

As an example of operations to temporally stop the emission of the laser beam to the surface of the upper plate W1, the output of the laser beam from the laser oscillator 2 can be temporally stopped. Also, the focal position of the laser beam that is applied along each scanning locus SC1 to SC5 may be a position where the laser beam penetrates the upper plate W1 or a position where the laser beam does not penetrate the upper plate W1 (i.e. a position on the surface of the upper plate W1).

Hereinafter, the laser beam emitting steps will be specifically described. FIGS. 2 to 6 show the respective laser beam emitting steps. Among them, the respective Figures (a) each show a plan view of the workpiece W and the scanning locus of the laser beam while the respective Figures (b) each show a cross-sectional view illustrating the joining region of the workpiece W and the laser beam (more specifically, each state in which the scanning position with the laser beam is moved at the rightmost position and at the leftmost position of the Figure).

As shown in these Figures, in the laser welding according to this embodiment, five stages of emission of the laser beam (scanning with the laser beam) are performed (i.e. from the first laser beam emitting step to the fifth laser beam emitting step) such that a joining region having the desired outer diameter size is formed.

Figure 7:
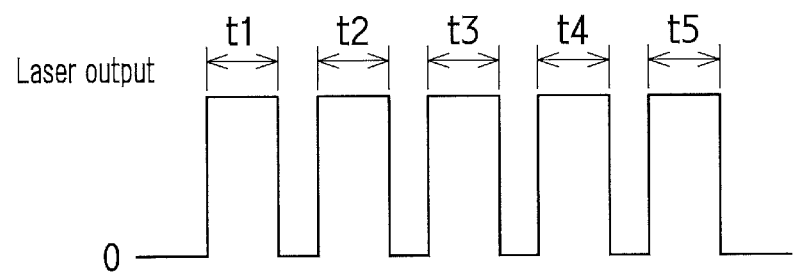
FIG. 7 is a graph indicating change in laser output in the laser beam emitting steps.

The scanning locus (concentric circular scanning locus) to be scanned with the laser beam in this case has the diameter size that gradually increases from the first laser beam emitting step to the fifth laser beam emitting step in this order. Also, the outputs of the laser beam in the respective laser beam emitting steps have the same value. FIG. 7 is a graph indicating change in the output of the laser beam in the laser beam emitting steps. In FIG. 7, the period t1 indicates the period for the first laser beam emitting step, the period t2 indicates the period for the second laser beam emitting step, the period t3 indicates the period for the third laser beam emitting step, the period t4 indicates the period for the fourth laser beam emitting step, and the period t5 indicates the period for the fifth laser beam emitting step. As shown in FIG. 7, there is a period in which the output of the laser beam is zero, i.e. the emission interval between each adjacent two of the laser beam emitting steps.

—Respective Laser Beam Emitting Steps—

Hereinafter, the respective laser beam emitting steps are described.

Figure 2:
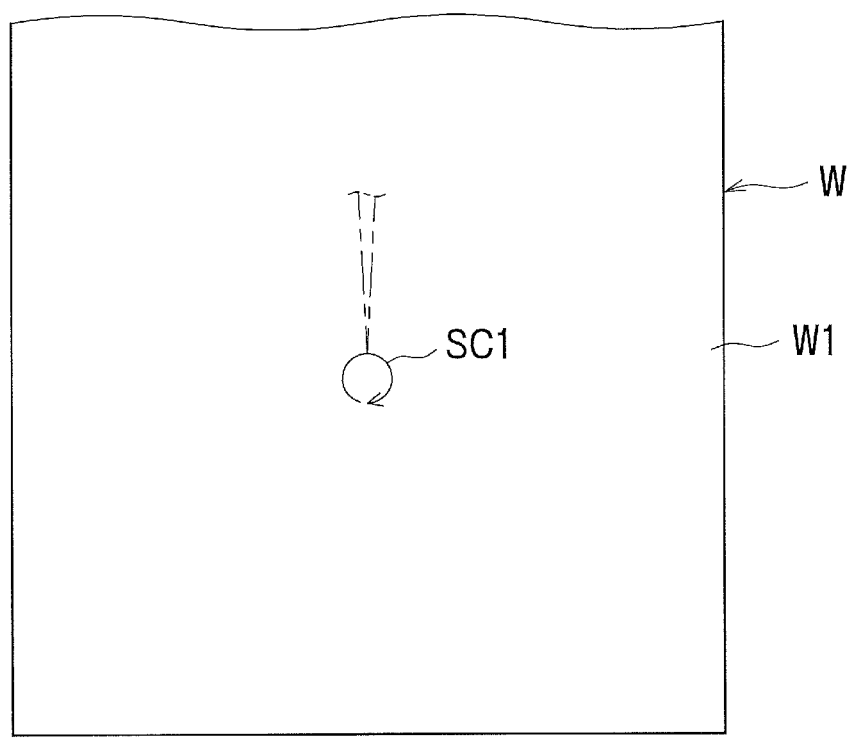
FIG. 2 are diagrams illustrating a first laser beam emitting step.
Figure 2:
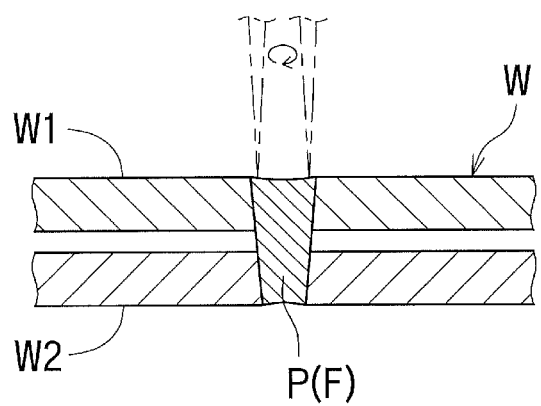

FIG. 2 indicate the first laser beam emitting step (the laser beam emitting step performed for the first time). In the first laser beam emitting step, the scanning locus (the first scanning locus SC1) with the laser beam has the smallest diameter size (that is, the diameter size is smaller than the respective diameter sizes of the scanning loci SC2 to SC5 with the laser beam in the other laser beam emitting steps). Accordingly, the molten part of the metal material of the upper plate W1 and the lower plate W2 also has a small diameter size. In other words, the volume of the molten metal F is small. In the first laser beam emitting step, the laser beam is applied along the first scanning locus SC1 such that the laser beam is rotated (revolved) multiple times along the first scanning locus SC1. The number of rotations (the number of revolutions) of the laser beam is experimentally determined as a value to obtain the volume of the molten metal F to be bridged over the upper plate W1 and the lower plate W2.

In the first laser beam emitting step in which the laser beam is rotated multiple times along the first scanning locus SC1, the upper plate W1 and the lower plate W2 are molten at the first scanning locus SC1 and in the vicinity thereof. Thus, a molten pool P is formed by the molten metal F. By the scanning with the laser beam, the molten metal F in the molten pool P is stirred and flowed. That is, the molten metal F is agitated within the molten pool P. In this case, the molten pool P is formed so as to have a cone shape due to the flow of the molten metal F in the circumferential direction. At the same time, the molten metal F is undulated in the molten pool P. The molten pool P in which the molten metal F is undulated is aggregated due to the surface tension of the molten metal F, thus is formed as a joining part that does not have a hollow or a separated bead. In this way, the upper plate W1 and the lower plate W2 are integrally welded. As described above, since the molten metal F is undulated while flowing in the molten pool P due to the scanning with the laser beam, the molten pool P is sufficiently molten and stirred so that bubbles are satisfactorily discharged. Since the molten pool P is also undulated while flowing due to the scanning with the laser beam, the molten pool P is sufficiently stirred so that elements are sufficiently diffused to prevent segregation, and that the temperature is uniformized to reduce the heterogeneous state of the structure.

Figure 3:
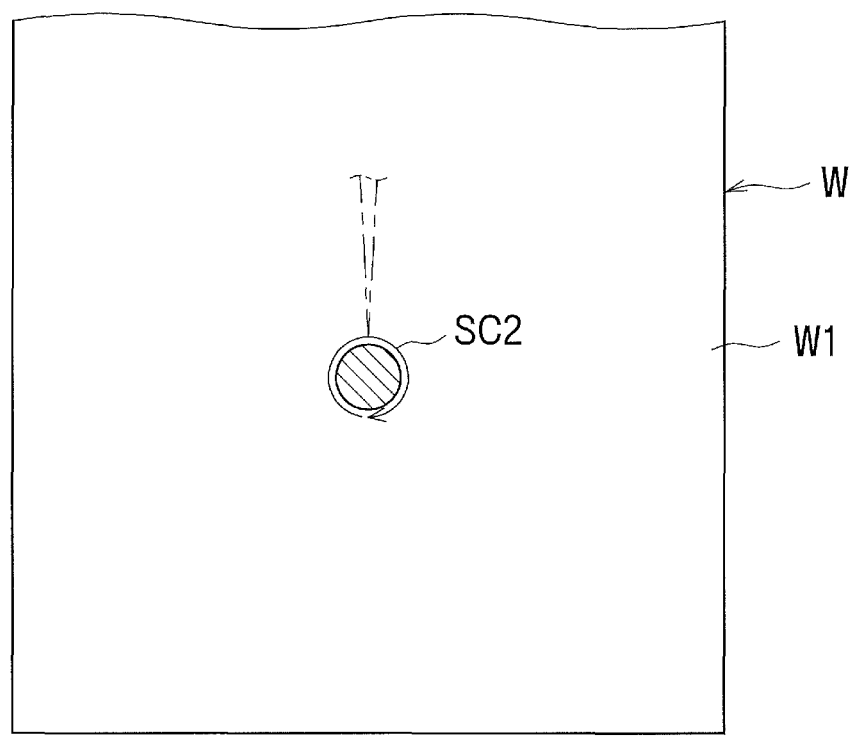
FIG. 3 are diagrams respectively corresponding to FIG. 2 in a second laser beam emitting step.
Figure 3:
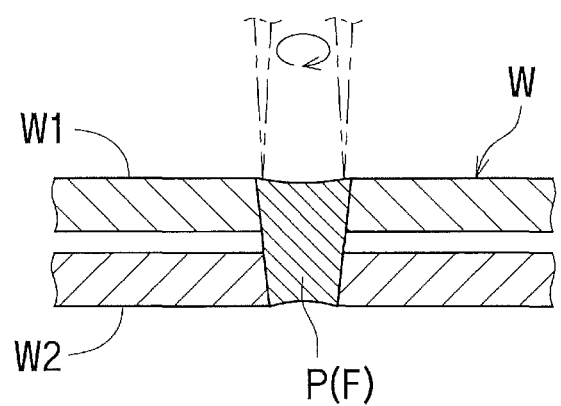

FIG. 3 indicate the second laser beam emitting step (the laser beam emitting step performed for the second time). In FIG. 3, the region indicated by the hatched lines is the joining region made by hardening the metal that has been molten in the first laser beam emitting step. The second laser beam emitting step is performed at the emission interval after termination of the first laser beam emitting step. The diameter size of the scanning locus with the laser beam in the second laser beam emitting step (the second scanning locus SC2) is larger than the diameter size of the first scanning locus SC1. Accordingly, the molten part of the metal material of the upper plate W1 and the lower plate W2 in the second laser beam emitting step also has a diameter size larger than the diameter size of the molten part of the metal material of the upper plate W1 and the lower plate W2 in the first laser beam emitting step. In the second laser beam emitting step, the laser beam is applied along the second scanning locus SC2 such that the laser beam is rotated (revolved) multiple times along the second scanning locus SC2. The number of rotations (the number of revolutions) of the laser beam is experimentally determined as a certain value to obtain the volume of the molten metal F to be newly bridged over the upper plate W1 and the lower plate W2.

In the second laser beam emitting step, the upper plate W1 and the lower plate W2 are molten at the second scanning locus SC2 and in the vicinity thereof, similarly to the above-described first laser beam emitting step. Thus, the molten pool P is formed by the molten metal F. By the scanning with the laser beam, the molten metal F in the molten pool P is stirred and flowed. That is, the molten metal F is agitated within the molten pool P. Since the molten metal F is undulated while flowing in the molten pool P due to the scanning with the laser beam, bubbles are satisfactorily discharged from the molten pool P. Also in the molten pool P, elements are sufficiently diffused to prevent segregation, and the temperature is uniformized to reduce the heterogeneous state of the structure.

Figure 4:
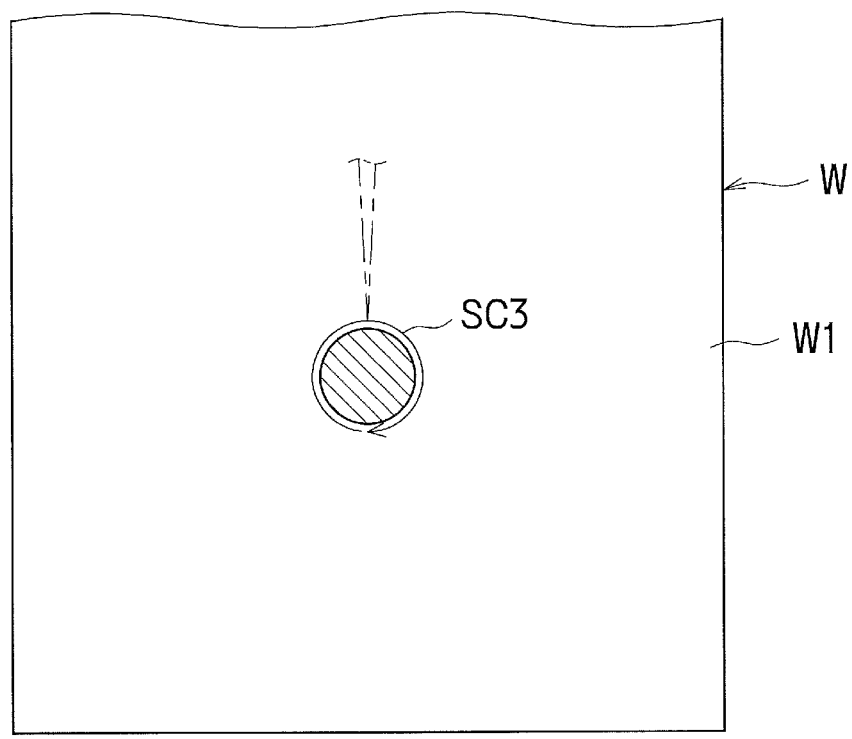
FIG. 4 are diagrams respectively corresponding to FIG. 2 in a third laser beam emitting step.
Figure 4:
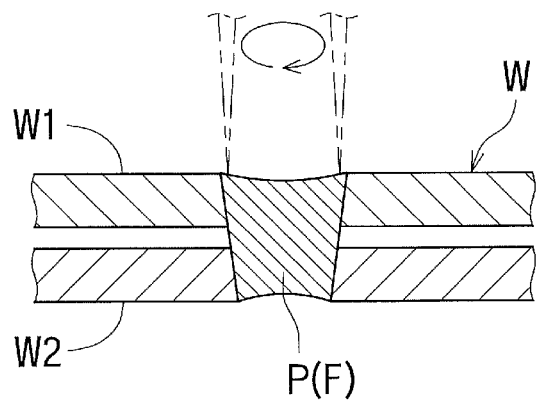
Figure 5:
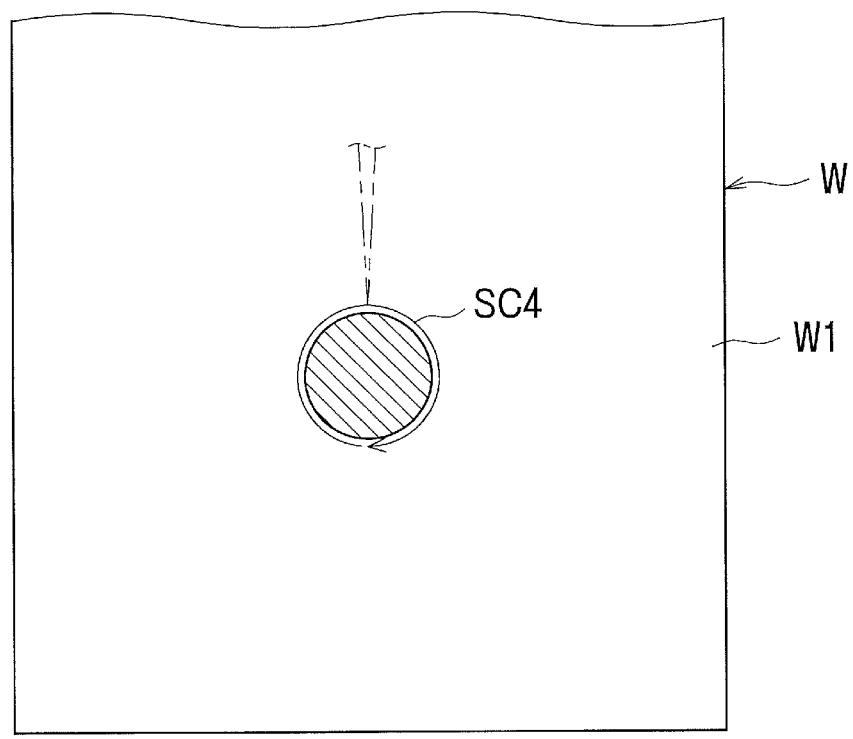
FIG. 5 are diagrams respectively corresponding to FIG. 2 in a fourth laser beam emitting step.
Figure 5:
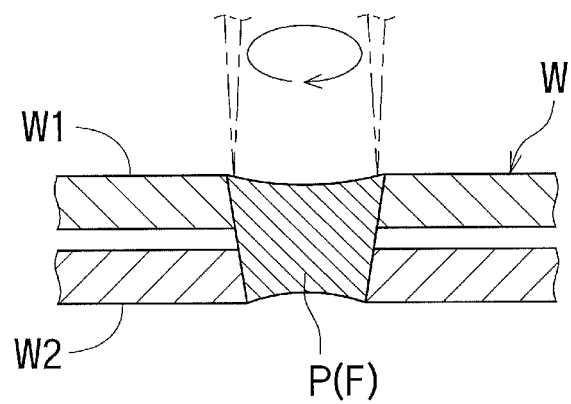
Figure 6:
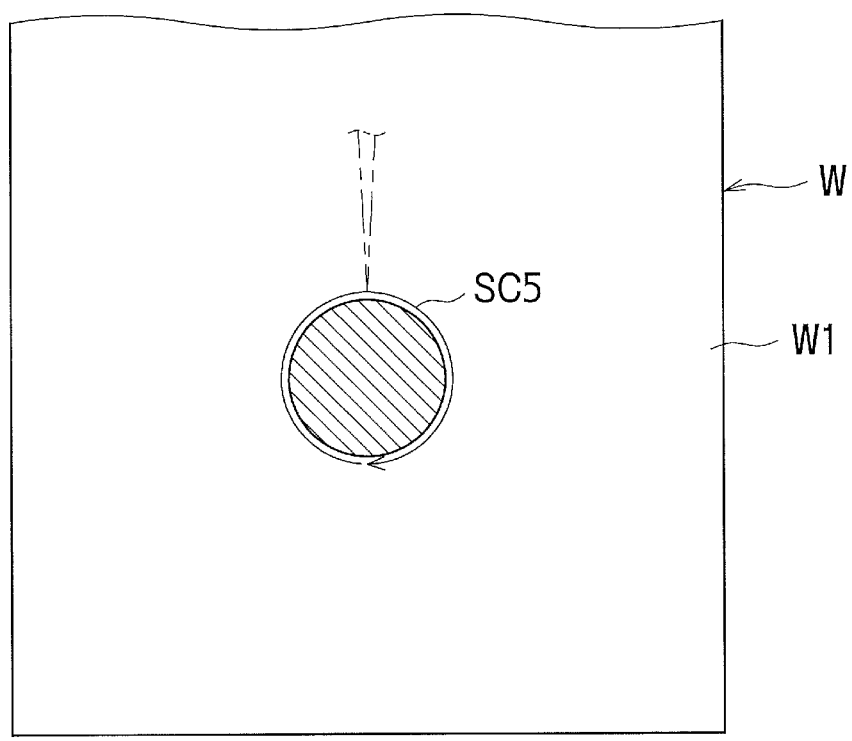
FIG. 6 are diagrams respectively corresponding to FIG. 2 in a fifth laser beam emitting step.
Figure 6:
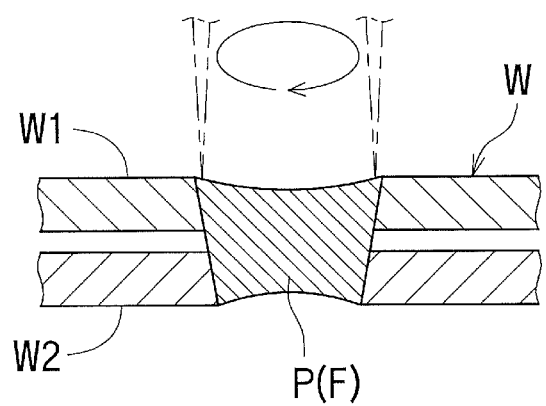

FIG. 4 indicate the third laser beam emitting step (the laser beam emitting step performed for the third time). FIG. 5 indicate the fourth laser beam emitting step (the laser beam emitting step performed for the fourth time). FIG. 6 indicate the fifth laser beam emitting step (the laser beam emitting step performed for the fifth (final) time). In these Figures also, each region indicated by the hatched lines is the joining region made by hardening the metal that has been molten in the previous step. Each of these laser beam emitting steps is performed at the emission interval after termination of the previous step. The diameter size of the scanning locus to be scanned with the laser beam in each of these laser beam emitting steps (specifically, the third scanning locus SC3, the fourth scanning locus SC4 and the fifth scanning locus SC5) is larger than the diameter size of the scanning locus in the previous step. Accordingly, the molten part of the metal material of the upper plate W1 and the lower plate W2 in each of the laser beam emitting steps also has a diameter size larger than the diameter size of the molten part of the metal material of the upper plate W1 and the lower plate W2 in the previous step. In each of these laser beam emitting steps, the laser beam is applied along the corresponding scanning locus to be scanned with the laser beam (specifically, the third scanning locus SC3, the fourth scanning locus SC4 and the fifth scanning locus SC5) such that the laser beam is rotated (revolved) multiple times along the corresponding scanning locus. The number of rotations (the number of revolutions) of the laser beam is experimentally determined as a certain value to obtain the volume of the molten metal F to be newly bridged over the upper plate W1 and the lower plate W2.

In the respective steps from the third laser beam emitting step to the fifth laser beam emitting step also, the upper plate W1 and the lower plate W2 are molten at the respective scanning loci SC3, SC4 and SC5 and in the vicinities thereof, similarly to the above-described first laser beam emitting step. Thus, the molten pool P is formed by the molten metal F. By the scanning with the laser beam, the molten metal F in the molten pool P is stirred and flowed. Thus, bubbles are satisfactorily discharged from the molten pool P. Also in the molten pool P, elements are sufficiently diffused to prevent segregation, and the temperature is uniformized to reduce the heterogeneous state of the structure.

Welding conditions for the respective laser beam emitting steps are specifically described. Examples of the welding conditions include: the diameter size of the scanning locus to be scanned with the laser beam; the scanning speed; the output of the laser beam; and the length of the emission interval. Note that specific values of the welding conditions are listed hereinafter as an example in which the upper plate W1 and the lower plate W2 both have a plate thickness of 1.0 mm and their plate gap is 0.8 mm.

In this embodiment, the diameter size of the scanning locus to be scanned with the laser beam is set such that the respective diameter sizes of the scanning loci SC1 to SC5 increase at regular intervals from the first laser beam emitting step to the fifth laser beam emitting step. For example, the diameter size of the first scanning locus SC1 in the first laser beam emitting step is 0.4 mm, the diameter size of the second scanning locus SC2 in the second laser beam emitting step is 0.8 mm, the diameter size of the third scanning locus SC3 in the third laser beam emitting step is 1.2 mm, the diameter size of the fourth scanning locus SC4 in the fourth laser beam emitting step is 1.6 mm, and the diameter size of the fifth scanning locus SC5 in the fifth laser beam emitting step is 2.0 mm. However, these values are not limited thereto.

Also, the scanning speed is the same through all of the first laser beam emitting step to the fifth laser beam emitting step. For example, the scanning speed is set to 20 m/min. However, this value also is not limited thereto. Furthermore, the respective laser beam emitting steps may have different scanning speeds.

Also, the output of the laser beam is the same through all of the first laser beam emitting step to the fifth laser beam emitting step, as described above. For example, the output of the laser beam is set to 4,000 W. However, this value also is not limited thereto.

Also, the respective lengths of the emission intervals that are set between the laser beam emitting steps are the same. The length of the emission interval is set as a period of time that is needed to stabilize the cone-shaped molten pool P made of the metal molten in one laser beam emitting step after termination of this laser beam emitting step. For example, the length of the emission interval is set to 0.05 sec. However, this value is not limited thereto.

Under the welding conditions set as described above, the first laser beam emitting step to the fifth laser beam emitting step are sequentially performed. Thus, the upper plate W1 and the lower plate W2 are integrally joined at the joining region.

—Effect Provided by Embodiment—

As described above, in this embodiment, the laser beam emitting steps (i.e. the first laser beam emitting step to the fifth laser beam emitting step with the emission interval being set between each adjacent two thereof) are repeatedly performed. Accordingly, every time the scanning locus to be scanned with the laser beam is shifted, a period is provided to cool the metal that has been molten due to the previous irradiation with the laser beam. Such lowering of the temperature of the molten metal F increases its viscosity, which leads to reduction in the mass of the metal molten by irradiation with the laser beam after the scanning locus to be scanned with the laser beam is shifted (i.e. the mass of the molten metal F having the low viscosity is reduced). As a result, it is possible to prevent generation of the welding defect such as "burn through" in which the molten metal F is detached from the upper plate W1. That is, the "burn through" can be reduced even when the area of the joining region is increased. Therefore, it is possible to ensure the sufficient joining strength between the metal plates W1 and W2 by increasing the area of the joining region while preventing the "burn through" of the molten metal F.

Also, by providing the emission interval, the subsequent irradiation with the laser beam (i.e. application of the laser beam along the outer circular scanning locus) is performed after the temperature of the molten metal F has lowered. Thus, it is possible to reduce the heat input per unit volume to the molten metal F and to reduce spatter. As a result, it is possible to prevent thinning of the molten metal F that is bridged over the upper plate W1 and the lower plate W2. In this way also, it is possible to prevent detaching of the molten metal F from the upper plate W1 and to ensure the sufficient joining strength between the upper plate W1 and the lower plate W2.

EXAMPLES

Here, a description will be given on examples conducted in order to confirm the above-described effects.

As a first Example, the joining regions were respectively made by welding two metal plates using the laser welding method according to the above-described embodiment and using the conventional laser welding method, so that the respective cross-sections of the joining regions were compared to each other.

Figure 8:
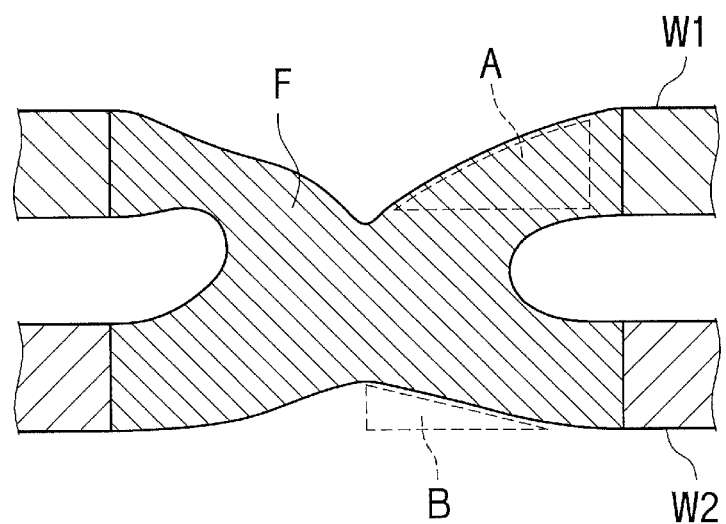
FIG. 8 is a cross-sectional view illustrating the joining region of the metal plates as an experimental result when two metal plates are welded by the laser welding method according to the embodiment.
Figure 9:
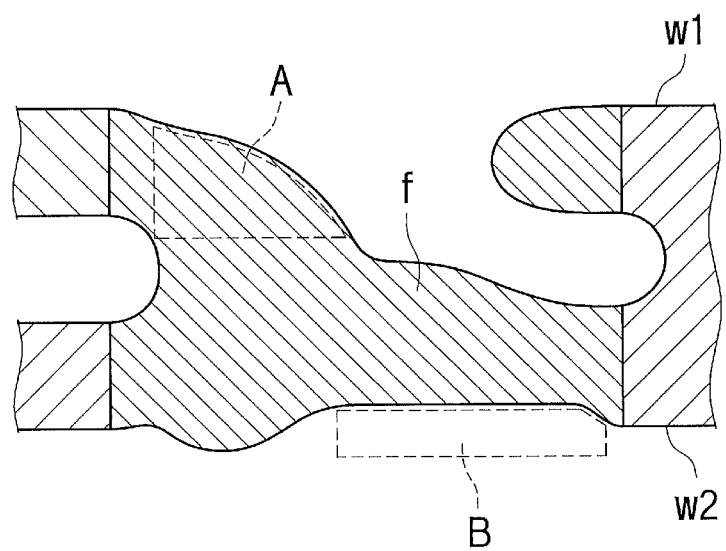
FIG. 9 is a cross-sectional view illustrating the joining region of the metal plates as an experimental result when two metal plates are welded by the conventional laser welding method.

FIG. 8 is a cross-sectional view illustrating the joining region of the metal plates W1 and W2 as the experimental result when the two metal plates W1 and W2 were welded by the laser welding method according to this embodiment. FIG. 9 is a cross-sectional view illustrating the joining region of metal plates w1 and w2 as the experimental result when the two metal plates w1 and w2 were welded by the conventional laser welding method.

In the joining region made by the conventional laser welding method as shown in FIG. 9, the molten metal f was detached from the upper plate w1 to generate "burn through". In the part where the "burn through" was generated, the molten metal f was not bridged between the upper plate w1 and the lower plate w2, which means that the sufficient joining strength was not ensured.

In contrast to the above, in the joining region made by the laser welding method according to this embodiment as shown in FIG. 8, no "burn through" was generated, and the molten metal F was bridged between the upper plate W1 and the lower plate W2 over the entire joining region, which means that the sufficient joining strength was ensured.

Especially, in order to obtain the above-described effects, it is preferable that a region A (i.e. a bridging part of the molten metal F/f to the upper plate W1/w1) in the Figures has a large cross-sectional area while a region B (i.e. a recess formed in the lower plate W2/w2; as the recess increases, the molten metal F/f is more thinned) has a small cross-sectional area. These cross-sectional areas were measured. When the laser welding method of this embodiment was applied, the result showed that the cross-sectional area of the region A was approximately two times the cross-sectional area of the region B. In contrast, when the conventional laser welding method was applied, the result showed that the cross-sectional area of the region A was only about 90% of the cross-sectional area of the region B.

As a second Example, the joining regions were respectively made by welding three metal plates using the laser welding method according to the above-described embodiment and using the conventional laser welding method, so that the respective cross-sections of the joining regions were compared to each other.

Figure 10:
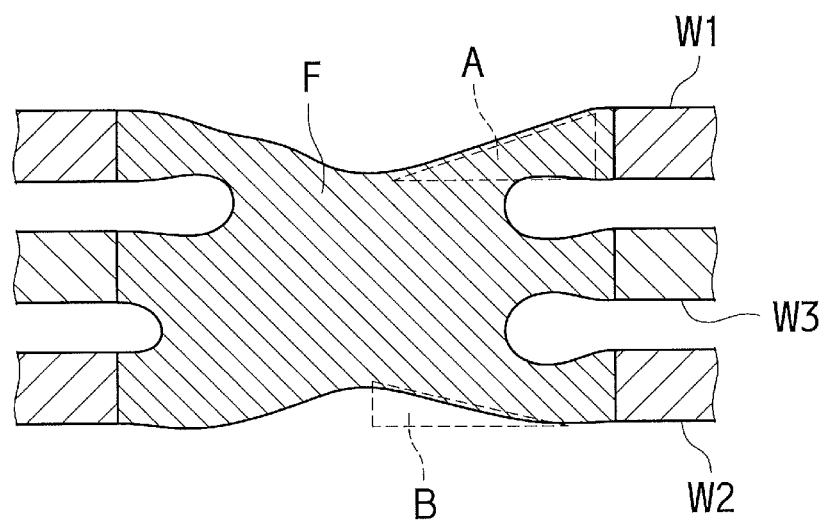
FIG. 10 is a cross-sectional view illustrating the joining region of the metal plates as an experimental result when three metal plates are welded by the laser welding method according to the embodiment.
Figure 11:
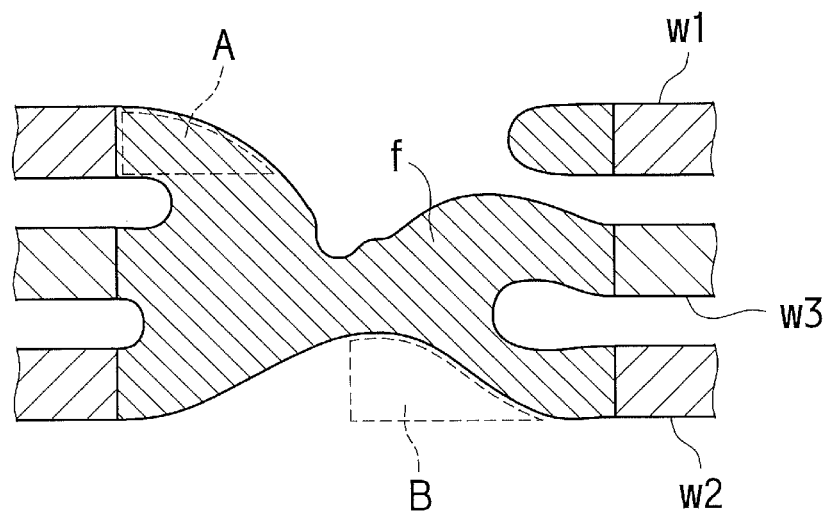
FIG. 11 is a cross-sectional view illustrating the joining region of the metal plates as an experimental result when three metal plates are welded by the conventional laser welding method.

FIG. 10 is a cross-sectional view illustrating the joining region of the metal plates W1, W2 and W3 as the experimental result when the three metal plates W1, W2 and W3 were welded by the laser welding method according to this embodiment. FIG. 11 is a cross-sectional view illustrating the joining region of metal plates w1, w2 and w3 as the experimental result when the three metal plates w1, w2 and w3 were welded by the conventional laser welding method.

In the joining region made by the conventional laser welding method as shown in FIG. 11, the molten metal f was detached from the upper plate w1 to generate "burn through". In the part where the "burn through" was generated, the molten metal f was not bridged between the upper plate w1 and the intermediate plate w3, which means that the sufficient joining strength was not ensured.

In contrast to the above, in the joining region made by the laser welding method according to this embodiment as shown in FIG. 10, no "burn through" was generated, and the molten metal F was bridged between the upper plate W1 and the intermediate plate W3 over the entire joining region, which means that the sufficient joining strength was ensured.

Especially, in order to obtain the above-described effects, it is preferable that the region A in the Figures has a large cross-sectional area while the region B has a small cross-sectional area. These cross-sectional areas were measured. When the laser welding method of this embodiment was applied, the result showed that the cross-sectional area of the region A was approximately two times half the cross-sectional area of the region B. In contrast, when the conventional laser welding method was applied, the result showed that the cross-sectional area of the region A was only about 90% of the cross-sectional area of the region B.

(Variation 1)

Here, Variation 1 is described. In this Variation, the output of the laser beam in the respective laser beam emitting steps is changed. Since the other configuration and the welding method are the same as those in the above-described embodiment, only the change in the output of the laser beam will be described hereinafter.

Figure 12:
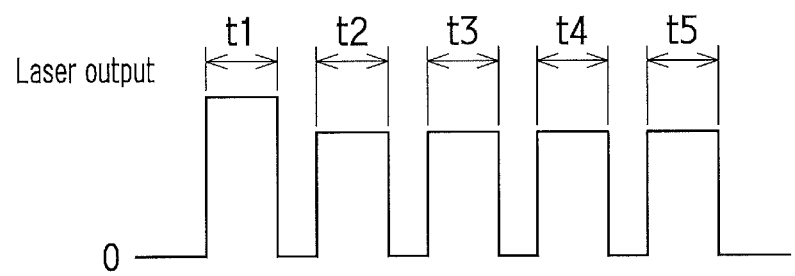
FIG. 12 is a graph indicating change in laser output in the laser beam emitting steps in Variation 1.

FIG. 12 is a graph indicating the change in the output of the laser beam in the laser beam emitting steps in this Variation. In FIG. 12, the period t1 indicates the period for the first laser beam emitting step, the period t2 indicates the period for the second laser beam emitting step, the period t3 indicates the period for the third laser beam emitting step, the period t4 indicates the period for the fourth laser beam emitting step, and the period t5 indicates the period for the fifth laser beam emitting step.

In the above-described embodiment, the output of the laser beam is the same through all the first laser beam emitting step to the fifth laser beam emitting step (see FIG. 7). In contrast, in this Variation, the output of the laser beam in the first laser beam emitting step is set larger than the output of the laser beam in the respective other laser beam emitting steps (i.e. from the second laser beam emitting step to the fifth laser beam emitting step). That is, the output of the laser beam that is applied to the innermost circular scanning locus in the joining region is set larger than the output of the laser beam that is applied to the respective other circular scanning loci. The relationship between the output of the laser beam in the first laser beam emitting step and the output of the laser beam in the respective other laser beam emitting steps (for example, the output ratio of the laser beam) is set based on experiments and/or simulations. As one example, the output of the laser beam in the first laser beam emitting step is set to 20% higher than the output of the laser beam in the respective other laser beam emitting steps. However, the above value is not limited thereto.

When the laser beam is applied to the innermost first scanning locus SC1 in the joining region, the metal material of the joining region has not at all been molten yet. Thus, the metal material requires a large heat input in order to be molten compared to the case in which the laser beam is applied to any of the other scanning loci SC2 to SC5 (i.e. the case in which the metal material has already been molten at the inner circular scanning locus). Taking into account the above circumstances, in this Variation, the output of the laser beam applied to the innermost first scanning locus SC1 is set larger than the output of the laser beam applied to any of the other scanning loci SC2 to SC5, so that the metal material in the vicinity of the first scanning locus SC1 is effectively molten and the time required to perform the laser welding is shorten. In this case, it is possible to ensure the sufficient joining strength between the metal plates W1 and W2 by increasing the area of the joining region while preventing the "burn through" of the molten metal F, and in addition, it is possible to reduce the time required to perform the laser welding (i.e. a circle time) for one joining region.

(Variation 2)

Here, Variation 2 is described. In this Variation also, the output of the laser beam in the respective laser beam emitting steps is changed. Since the other configuration and the welding method are the same as those in the above-described embodiment, only the change in the output of the laser beam will be described hereinafter.

Figure 13:
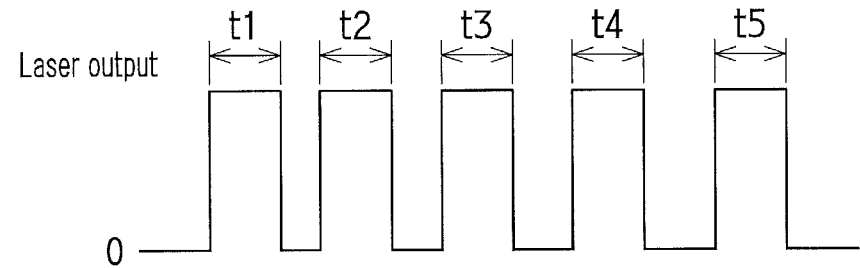
FIG. 13 is a graph indicating change in laser output in the laser beam emitting steps in Variation 2.

FIG. 13 is a graph indicating the change in the output of the laser beam in the laser beam emitting steps in this Variation. In FIG. 13, the period t1 indicates the period for the first laser beam emitting step, the period t2 indicates the period for the second laser beam emitting step, the period t3 indicates the period for the third laser beam emitting step, the period t4 indicates the period for the fourth laser beam emitting step, and the period t5 indicates the period for the fifth laser beam emitting step.

In the above-described embodiment, every length of the emission interval between the adjacent two steps of the first laser beam emitting step to the fifth laser beam emitting step is the same (see FIG. 7). On the other hand, in this Variation, the length of the emission interval becomes longer as the laser beam emitting steps proceed. That is, the length of the emission interval is set longer as the circular scanning locus to be scanned with the laser beam is shifted to the outer one. The ratio of the respective lengths of the emission intervals is set based on experiments and/or simulations. As one example, the length of the emission interval is set to 20% longer every time the scanning locus to be scanned with the laser beam is shifted. However, the above value is not limited thereto.

When the scanning locus to be scanned with the laser beam is sequentially shifted from the inner circular scanning locus to the outer circular scanning locus in the joining region, the subsequent irradiation with the laser beam (i.e. application of the laser beam along the outer circular scanning locus) is performed before the molten metal F has completely hardened, even when the emission interval is provided. In other words, the subsequent irradiation with the laser beam is performed on the metal plates W1 and W2 in which heat is stored. The amount of heat stored in the metal plates has a tendency to increase as the irradiation with the laser beam is shifted between the adjacent two of the circular scanning loci on the outer side. Taking into account the above circumstances, in this Variation, the length of the emission interval is set longer as the circular scanning locus to be scanned with the laser beam is shifted to the outer one, so that hardening of the molten metal F is accelerated (in other words, the viscosity is reduced). Therefore, the "burn through" of the molten metal F is reliably prevented.

(Variation 3)

Here, Variation 3 is described. In this Variation, the irradiation on the joining region with the laser beam differs from that in the above-described embodiment. Since the other configuration and the welding method are the same as those in the above-described embodiment, only the aspect of the irradiation with the laser beam will be described hereinafter.

In the above-described embodiment, the laser welding method is constituted of only the five steps, namely, the first laser beam emitting step to the fifth laser beam emitting step. In this Variation, an initial laser beam emitting step is performed as a step previous to the first laser beam emitting step, in which the laser beam is applied to one point of the central part of the joining region. That is, the position irradiated with the laser beam is fixed as one point that is not moved to make a scanning locus, thus only the central part of the joining region of the metal plates W1 and W2 is molten.

When the initial laser beam emitting step is performed, the output of the laser beam in this initial laser beam emitting step is set higher than the output of the laser beam in the respective other laser beam emitting steps (i.e. the first laser beam emitting step to the fifth laser beam emitting step). The relationship between the output of the laser beam in the initial laser beam emitting step and the output of the laser beam in the respective other laser beam emitting steps (for example, the output ratio of the laser beam) is set based on experiments and/or simulations. As one example, the output of the laser beam in the initial laser beam emitting step is set to 20% higher than the output of the laser beam in the respective other laser beam emitting steps. However, the above value is not limited thereto.

When the laser beam is applied to one point of the central part of the joining region in the initial laser beam emitting step, the metal material of the joining region has not at all been molten yet. Thus, the metal material requires a large heat input in order to be molten. Taking into account the above circumstances, in this Variation, the output of the laser beam applied to the one point of the central part of the joining region is set larger than the output of the laser beam applied to any of the circular scanning loci, so that the metal material in the central part of the joining region is effectively molten and the time required to perform the laser welding is shorten. In this case, it is possible to ensure the sufficient joining strength between the metal plates W1 and W2 by increasing the area of the joining region while preventing the "burn through" of the molten metal F, and in addition, it is possible to reduce the time required to perform the laser welding (i.e. a circle time) for one joining region.

(Variation 4)

Here, Variation 4 is described. In this Variation, the joining regions made by the laser welding method according to the above-described embodiment are disposed respectively at positions adjacent to one another.

Figure 14:
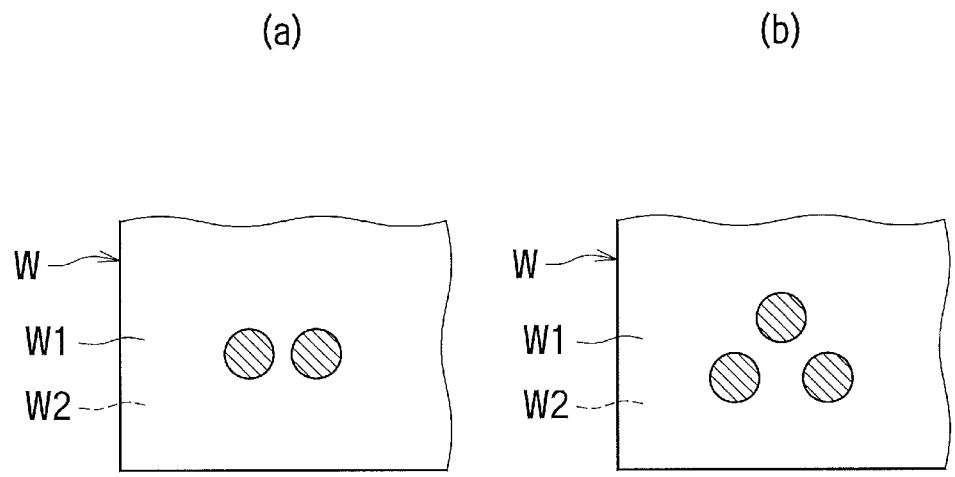
FIG. 14 are plan views illustrating the metal plate having a plurality of joining regions.
Figure 15:
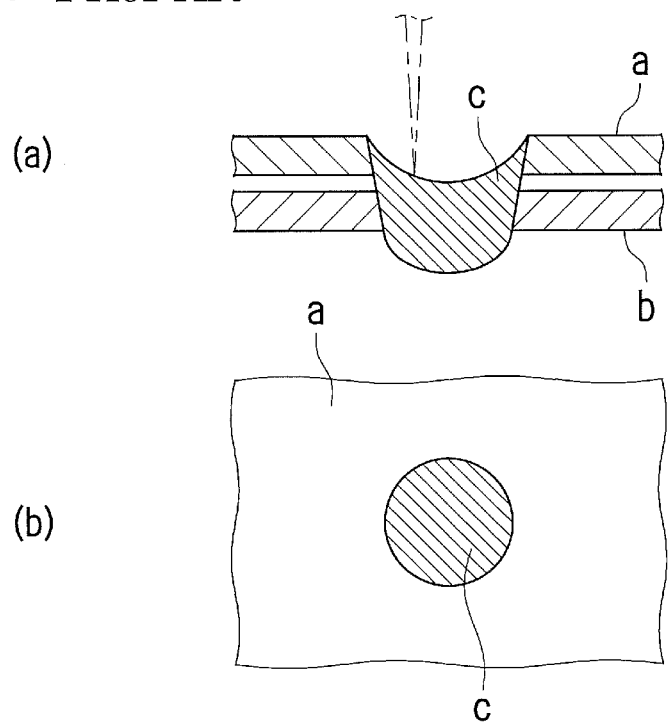
FIG. 15 are diagrams illustrating a state of the metal plates during irradiation with the laser beam in the conventional art.
Figure 16:
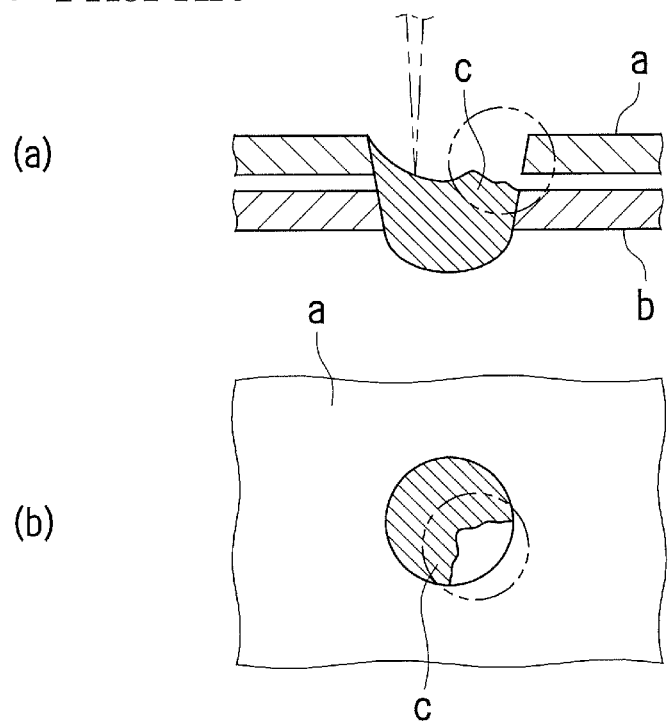
FIG. 16 are diagrams respectively corresponding to FIG. 15, which illustrate a state in which the irradiation with the laser beam is completed in the conventional art.

FIG. 14(a) is a plan view illustrating the workpiece W having two joining regions adjacent to each other. FIG. 14(b) is a plan view illustrating the workpiece W having three joining regions adjacent to one another. In both cases, the laser welding method similar to the method in the above-described embodiment is applied to the respective joining regions.

Also, any of the laser welding methods according to the above Variations may be applied to the respective joining regions.

OTHER EMBODIMENTS

The present invention is not limited to the above-described embodiment and the Variations. It can be appropriately modified and changed within the scope of the appended claims and equivalency thereof.

For example, in the above-described embodiment and the Variations, the description was given on the case in which the present invention was applied as a laser welding method performed by the laser welding apparatus 1 in the vehicle body manufacturing process. However, the present invention can be applied to the laser welding for other members.

Also, in the above-described embodiment and the Variations, the description was given on the case in which the present invention was applied as a laser welding method for welding two plate materials made of aluminum to each other. However, the present invention is not limited thereto. It may be applied as a laser welding method for welding three or more plate materials to one another. Also, the plate material to which is applicable the laser welding method of the present invention is not limited to aluminum. It may be made of iron, magnesium, titanium or copper. Furthermore, the present invention can be applied to the welding of dissimilar metals.

In the above-described embodiment and the Variations, the description was given on the case in which the metal plates W1 and W2 superimposed on each other in the vertical direction were subjected to the lap welding. In particular, the workpiece W was irradiated with the laser beam from the above. However, the present invention is not limited thereto. It may be applied to the lap welding of the metal plates superimposed on each other in the horizontal direction. That is, the present invention can be applied to the case in which the laser beam is applied to the workpiece in the horizontal direction.

Also in the above-described embodiment and the Variations, the laser beam emitting steps (the laser beam emitting steps along the circular scanning loci) are constituted of the five steps from the first laser beam emitting step to the fifth laser beam emitting step. However, the present invention is not limited thereto. The laser beam emitting steps may be constituted of four or less laser beam emitting steps, or may be constituted of six or more laser beam emitting steps.

INDUSTRIAL APPLICABILITY

The present invention is suitably applicable to a laser welding method in which a lap welding with the laser beam is performed to aluminum metal plates.

REFERENCE SIGNS LIST

1 Laser welding apparatus
2 Laser oscillator
3 Laser scanner
W Workpiece
W1 Upper plate (metal plate)
W2 Lower plate (metal plate)
F Molten metal
P Molten pool

What is claimed is:

1. A laser welding method for joining metal plates, comprising the steps of:

applying a laser beam along a first circular scanning locus a plurality of times, to a surface of a plurality of metal plates superimposed on each other;

melting the metal plates by scanning, with the laser beam, along the first circular scanning locus so as to make a molten pool constituted of the molten metal;

stirring the molten pool by scanning with the laser beam; after the stirring, temporally stopping the laser beam for an emission interval, wherein the emission interval is a period of time that an output of the laser beam is zero until the molten metal hardens into a joining region on the metal plates, wherein during the emission interval irradiation on the surface of the plurality of metal plates is stopped;

after the emission interval, which ends before the molten metal has completely hardened, thereby subsequent irradiation is performed with the laser beam on the metal plates in which heat is stored, applying the laser beam along a second circular scanning locus a plurality of times, wherein the second circular scanning locus is located circumferentially outside the first circular scanning locus and outside an outermost circumference of the joining region that was made during the emission interval by the hardened molten metal, wherein the second circular scanning locus that is a scanning locus of the laser beam emitted for a final time is located circumferentially outside of at least the first circular scanning locus that is a scanning locus of the laser beam emitted before the final time;

melting the metal plates by scanning, with the laser beam, along the second scanning locus so as to make another molten pool constituted of the molten metal; after scanning along the second circular scanning locus, stirring the another molten pool by scanning with the laser beam;

after the stirring, temporally stopping the laser beam for the emission interval, so as to increase the joining region made by the molten metal hardening; and wherein, an output of the laser beam that is applied to the first circular scanning locus in the joining region is set larger than an output of the laser beam that is applied to any other circular scanning loci.

2. The laser welding method according to claim 1, wherein the first circular scanning locus and the circular second scanning locus are concentric circles centered at a central part of the joining region.

3. The laser welding method according to claim 1, wherein, when the laser beam is applied to one point of a central part of the joining region before application of the laser beam to an innermost circular scanning locus in the joining region, an output of the laser beam applied to the one point of the central part is set larger than an output of the laser beam that is applied to any of the other circular scanning loci.

4. The laser welding method according to claim 1, wherein a length of the emission interval is set longer after scanning along the second circular scanning locus than after scanning along the first circular scanning locus.

* * * * *